April 10, 1945.  F. W. ROWE  2,373,341
MILLING MACHINE
Filed May 5, 1942  4 Sheets-Sheet 1
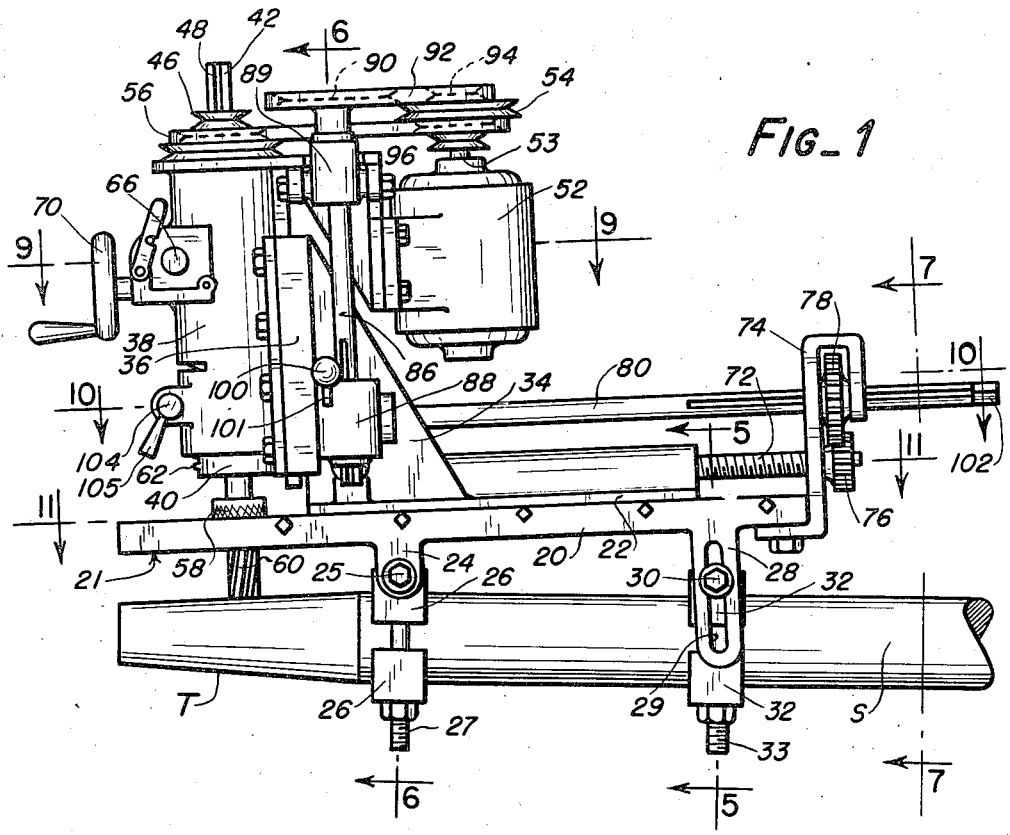
FIG_1
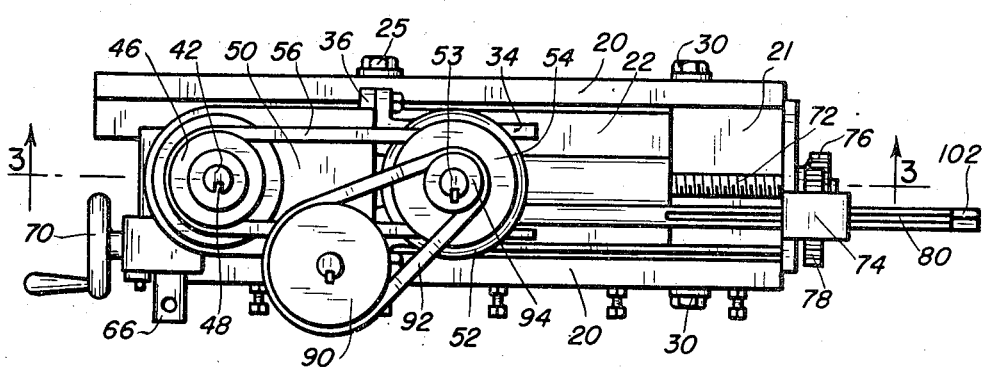
FIG_2
FRED W. ROWE
INVENTOR
BY Smith & Tuck
ATTORNEYS April 10, 1945.  F. W. ROWE  2,373,341
MILLING MACHINE
Filed May 5, 1942  4 Sheets-Sheet 2
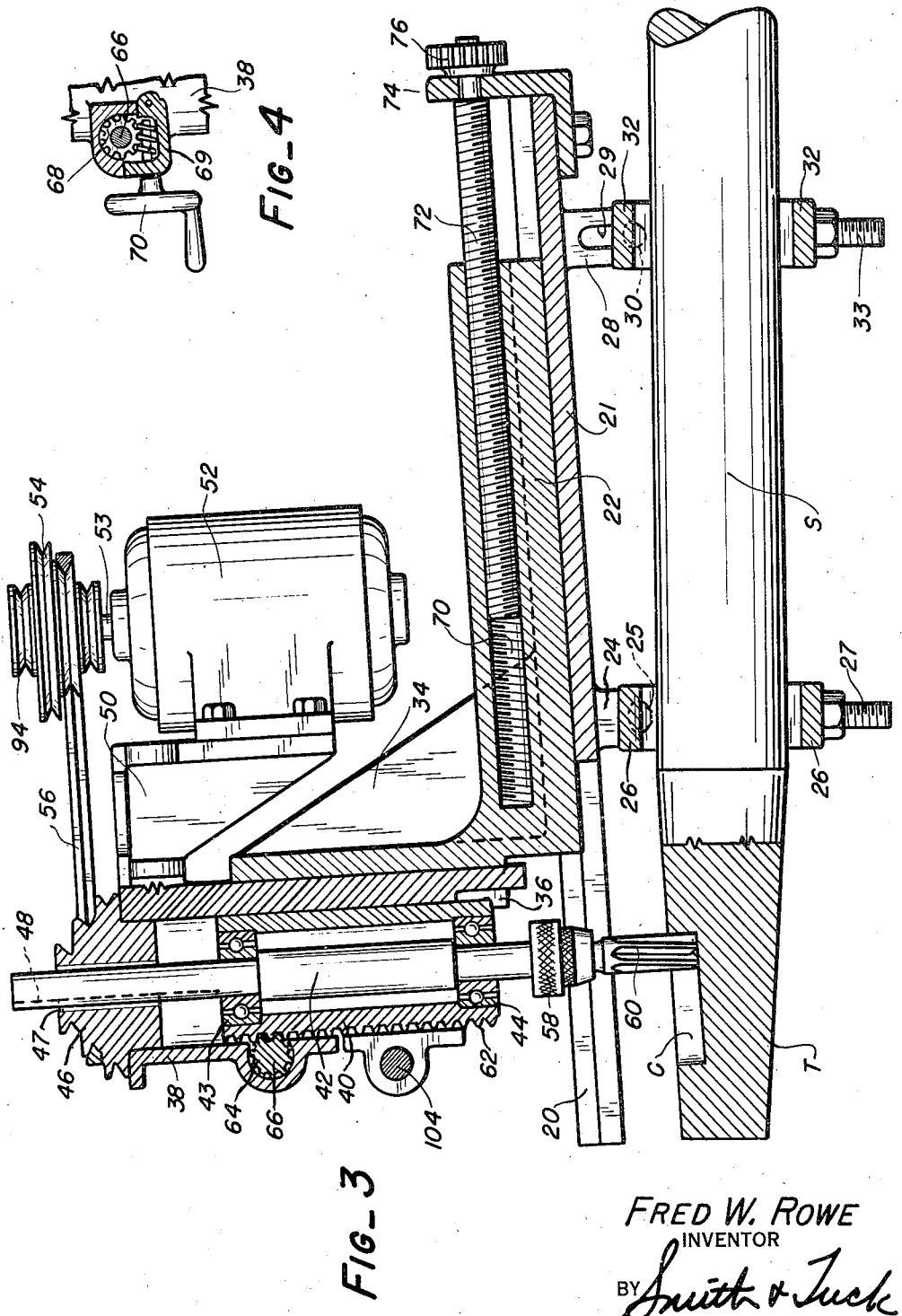
Fred W. Rowe
INVENTOR
BY Smith & Tuck
ATTORNEYS

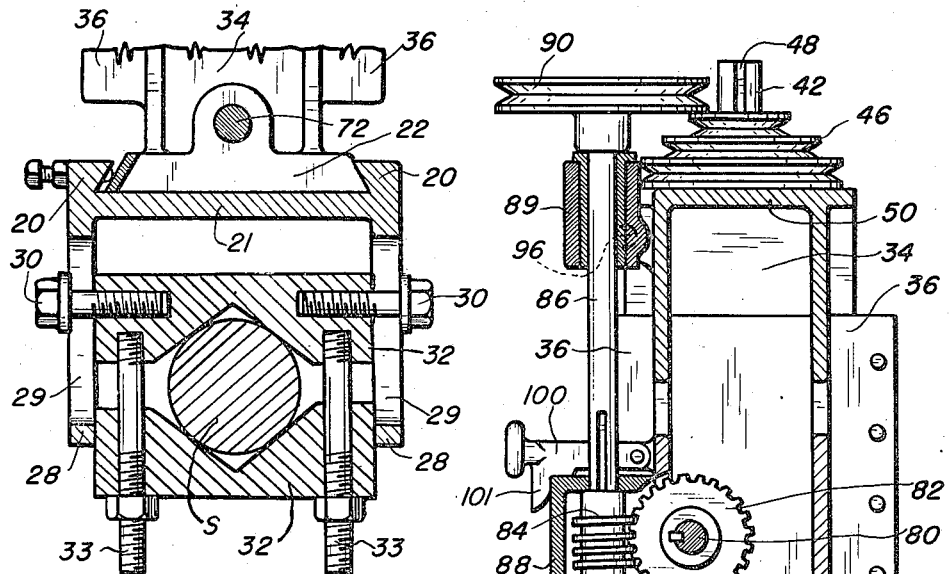
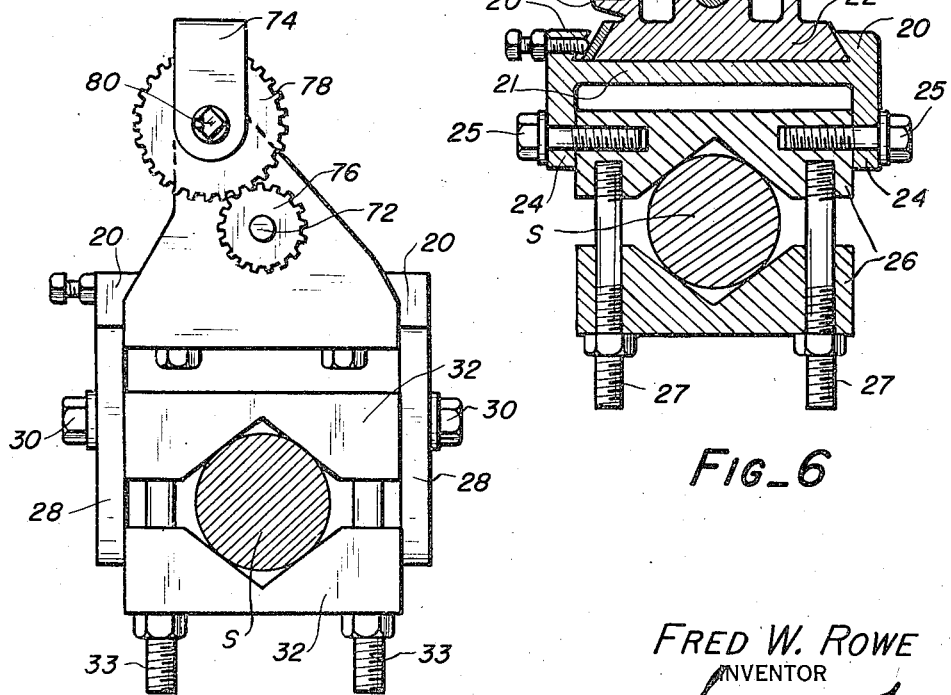

April 10, 1945.   F. W. ROWE   2,373,341
MILLING MACHINE
Filed May 5, 1942   4 Sheets-Sheet 4
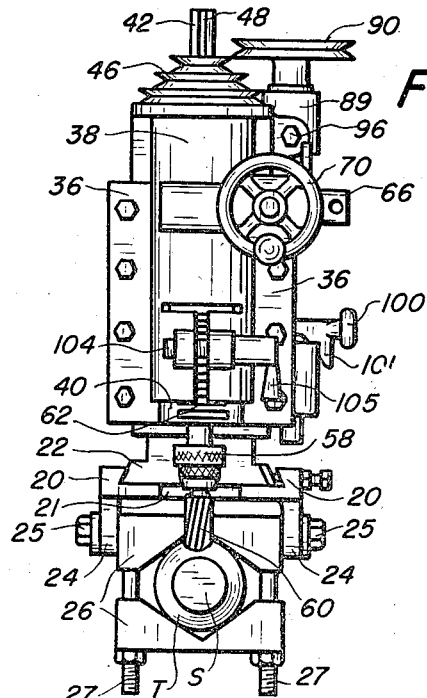
FIG_8
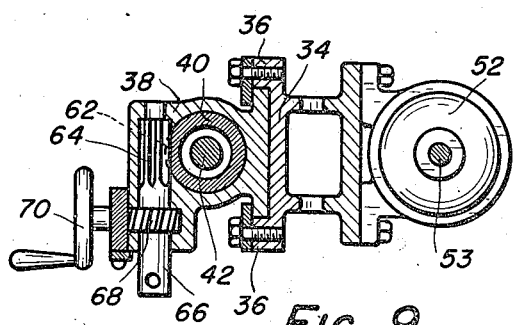
FIG_9
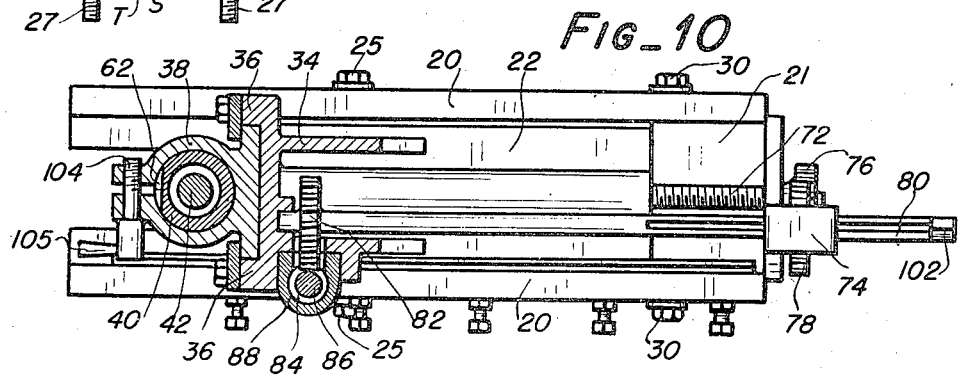
FIG_10
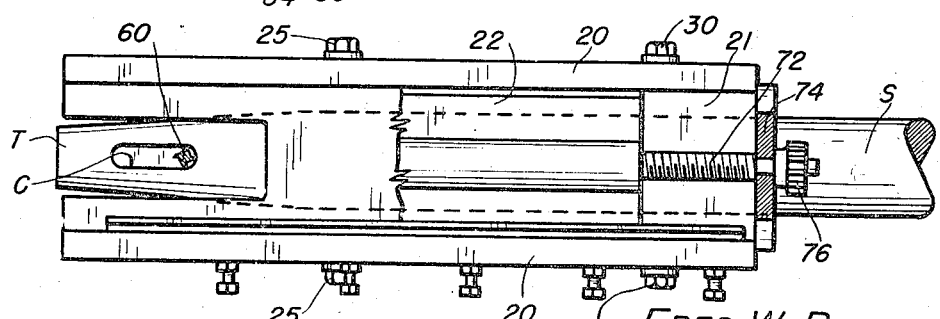
FIG_11
FRED W. ROWE
INVENTOR
BY Smith + Tuck
ATTORNEYS Patented Apr. 10, 1945

2,373,341

UNITED STATES PATENT OFFICE 2,373,341

MILLING MACHINE

Fred W. Rowe, Seattle, Wash.

Application May 5, 1942, Serial No. 441,790

2 Claims. (Cl. 90—12)

There has been a long-felt need for a portable milling machine which can be taken to a work piece and there engage the said work piece for positioning during a milling operation. There has also been a long-felt and acute need for a portable milling machine mountable upon a work piece, in which the mill may be presented to the work piece in any of several predetermined angles with relation to the axis of said work piece.

It is an important object of my invention to provide a milling machine that has a mill spindle that is both longitudinally and vertically movable with relation to the supporting base of the milling machine.

Another object of my invention is the provision of a milling machine that is portable and may be clamped to a work piece.

A further object of the invention relates to the provision of a portable milling machine adapted to be clamped to a work piece, that may be clamped so that the mill will be presented to the work piece at an angle thereto.

Still another and further object of the invention is to provide novel and useful clamping means for a portable milling machine so adapted that a mill will be presented to the work piece at an angle thereto, and that angularity will be retained until changed at the will of the operator.

The foregoing objects and others ancillary thereto I prefer to accomplish as follows:

According to a preferred embodiment of my invention, I provide a portable milling machine which has a supporting base adapted to be clamped to a work piece. On said base is mounted a longitudinally movable slide having an upright spindle, and carrying means for rotating the spindle, as well as means for moving the slide with relation to the longitudinal dimension of the supporting base.

Clamps are also provided for attaching the supporting base to a work piece, such as a shaft or the like, in spaced apart relation to each other. The base is adapted to be pivotally secured to one of said clamps so that it may be swung about said pivot and in an angular relation to the work piece, and said base also has means for securing a remote portion thereof from the pivot to the other of said clamps to maintain the angularity of the adjusted position of the supporting base. More specifically, the base has depending ears adapted to straddle spaced apart clamps that are attached to a work piece. One of said straddling pairs of ears will be pivotally mounted to one of said clamps and the other pair will be fixedly secured to the other clamp, irrespective of the angularly adjusted position of the supporting base.

The novel features that I consider characteristic of my invention are set forth with particularity in the appended claims. The invention itself, however, both as to its organization and method of operation, together with additional objects and advantages thereof, will best be understood from the following description of a specific embodiment, when read in connection with the accompanying drawings, in which Figure 1 is a side elevational view of my milling machine, Figure 2 is a top plan view of the milling machine of Figure 1, Figure 3 is a vertical, longitudinal sectional view taken on line 3—3 of Figure 2, Figure 4 is a detail view in section of the manually operated quill raising and lowering mechanism, Figure 5 is a vertical, transverse sectional view taken on line 5—5 of Figure 1, a portion of which has been omitted for convenience of illustration, Figure 6 is a vertical, transverse sectional view taken on line 6—6 of Figure 1, Figure 7 is a vertical elevational view taken in the plane indicated by line 7—7 of Figure 1, Figure 8 is a vertical, elevational view of the face end of my milling machine, Figure 9 is a horizontal sectional view on line 9—9 of Figure 1, Figure 10 is a horizontal sectional view on line 10—10 of Figure 1, and Figure 11 is a horizontal sectional view on line 11—11 of Figure 1.

A milling machine for the purposes here intended must have at least two totally distinct characteristics; it must be capable of being easily portable and readily attached to a shaft to be milled and it must provide a structure capable of being adjusted to cut at an angle with relation to the axis of the shaft to which it is clamped, so that with accuracy the milling operation may be performed within extreme tolerances. Accordingly, a preferred embodiment of my invention, referring to Figures 1 and 3 of the drawings, is constituted by a pair of ways 20 in the foundation 21 upon which the remaining structure is mounted. Between the ways is the longitudinally movable slide 22 which actually carries the operating mechanism of the milling machine.

The base 21 has a pair of depending ears 24 which are coupled by the pivot bolt 25 to the upper half of clamp 26. At the rear, in spaced relation to the previously described depending ears, is a second pair of arms 28 that are slotted at 29 to receive the clamp bolts 30. Bolts 30 are threadedly engaged in the upper half of clamp 32.

The two halves of each of the clamps 26 and 32 are drawn toward each other by bolts 27 and 33 respectively, and as shown throughout the drawings may be securely mounted upon a shaft S, that is to be milled by the use of the machine. If desired, base 21 may be clamped to any suitable support and the work piece brought in to milling position as in conventional milling practice.

A superstructure 34, mounted upon the base 22, is provided with forward vertical ways 36 in which is mounted, for sliding movement on occasion, the casing 38. The quill 40 is slidably mounted in casing 38 and in turn encloses the spindle 42, which is mounted in the bearings 43 and 44 carried by the quill. On its upper end, the spindle is keyed to the step sheave or pulley 46 by means of the key 47 in keyway 48. The spindle may be slidably moved with relation to the sheave and yet a positive drive will be maintained at all times.

Upon a bracket 50 on the rear of the casing 38 I hang the motor 52 which has keyed to its drive shaft 53 the stepped sheave 54. Between sheave 46 and sheave 54 extends the flexible drive belt 56. When the motor is energized, it will be seen that the spindle 42 is freely rotated to drive the chuck 58 on its lower end, into which may be fitted any one of several different types of milling tools or mill cutters, as 60.

The forward face of the quill is cut to form a rack 62 with which meshes the teeth of pinion 64 on shaft 66. Shaft 66, as can be seen in Figure 4, has a driven pinion 68 and the worm 69, rotated by the handwheel 70, imparts turning motion to shaft 66 to raise or lower the quill within its casing and consequently to raise or lower the mill 60.

On the rear upper side of the base 22, I provide a threaded feed nut 70 into which the feed screw 72 is engaged. The rear end of feed screw 72 is journaled in the upright arm 74, that is fixed to the base 21 at its rear end. Joined to screw 72 is the gear 76 which meshes with the drive gear 78 on the splined horizontal drive shaft 80.

Shaft 80, on its forward end, has a drive pinion 82 that is engaged in the usual manner by the worm 84 on the splined upright shaft 86. The upright shaft is journaled for rotation in the gear box 88 and upper bearing 89. Shaft 86 has a driven sheave 90 which is coupled by belt 92 to drive sheave 94, also rotated by the motor shaft 53.

Bearing 89 is pivoted at 96 on the upper end of casing 38 and the shaft carried thereby, as well as the housing 88, swings about this pivot on occasion to disengage worm 84 from pinion 82 to terminate rotation of the horizontal shaft 80. To facilitate this swinging action when desired, spring 98 between casing 88 and a portion of the superstructure 34 is provided. To restrain such swinging movement and to maintain the worm and pinion in driving mesh, I swingably mount the latch 100 which has a hook 101 that engages, as shown in Figure 6, over a corner or other suitable part of casing 88. When the latch is released, spring 98 urges the gears of the worm drive out of mesh, which action is also augmented by the normal tension of the drive belt between sheaves 90 and 94.

The mill spindle is moved longitudinally of base 21 by power applied through belt 92 from motor 52 to shaft 86, through the worm drive in casing 88, to the horizontal shaft 80, thence through gears 78 and 76, to the feed screw 72 to draw or repel nut 70 on the base 21. When such a longitudinal feed is not desired, the operator releases latch 100 and the spindle will remain in a fixed position upon the base. A crank may be attached to the squared end 102 of screw 72 for manual movement of the slide 22 when desired for slight adjustments.

The mill spindle is raised or lowered in the illustrated mechanism manually in the following manner: by rotating hand wheel 70 in either direction, power is applied through the worm 69 and pinion 68 to the pinion 64 that meshes with the rack 62 on the quill 40. To retain the quill in an adjusted vertical position, the lower split portion of casing 38 is clamped by bolt 104 that is handily turned by its handle 105.

It will be seen that wherever a shaft is rotated in a fixed journal to turn a gear or pinion that is mounted upon a movable part, the latter driven member is keyed slidably to its shaft. The reverse is also true where the shaft is fixed and a gear is moved with relation to it.

Whenever an operator wishes to make a horizontal cut with the mill 60, he usually engages the worm and pinion in casing 88 and the rotation of the motor shaft is transmitted to the feed screw 72 to move the base slide 22 in the ways. By using a reversible motor, this feed may be in either direction.

Throughout this specification I have spoken of the use of my machine for milling operations, but it will be obvious that the mechanism is also useful for drill operations performed in line with the axis of the spindle.

A typical use of my milling machine is shown in Figures 1, 3 and 11, wherein an end-mill has been fed downward into a portion of shaft S. This particular shaft has a tapered end T, and in Figure 3 an elongated cut at right angles to the tapered face is being made. It can be assumed that the cut C is a keyway. To so employ the machine, the mill must be caused to travel longitudinally of the shaft in addition to the required vertical movement to obtain penetration. In this case, the base 21 is shifted to bring it into alignment with the angle of the tapered face T by pivotal movement about the axis of bolt 25 in the upper half of clamp 26. To do so, bolt 30 has been loosened and the after end of base 21 has been raised with relation to clamp 32 and the shaft axis. To accommodate this movement and still maintain engagement between ear 28 and bolt 30, the ear is slotted at 29 and may be clamped wherever it is brought to rest.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a portable milling machine of the type wherein a supporting base having an upright milling spindle is adapted to be taken to a work piece, a pair of clamps to be secured to said work piece in spaced apart relation to each other and along the length of the work piece, pivot means on one of said clamps, means on said base to engage said pivot means, slotted ears on a remote portion of said base to lie alongside the other said clamp, and means for engaging in the slots of said ears for clamping said ears to the adjacent clamp irrespective of the alignment of the base with the work piece being clamped.

2. In a portable milling machine, a supporting base having two pairs of spaced apart depending ears, a pair of clamps adapted to be secured to a work piece in spaced apart relation to each other, each clamp to be straddled by a pair of the ears depending from said base, means for pivotally securing one pair of ears to one of said clamps whereby the base may be swung thereabout, the second pair of ears being slotted to be secured to the other clamp in the swung position of that portion of the base carrying said slotted ears with respect to the work piece.

FRED W. ROWE.